(12) United States Patent
Greinke

(10) Patent No.: US 6,406,612 B1
(45) Date of Patent: Jun. 18, 2002

(54) EXPANDABLE GRAPHITE AND METHOD

(75) Inventor: Ronald Alfred Greinke, Medina, OH (US)

(73) Assignee: Graftech Inc., Lakewood, OH (US)

( * ) Notice: Subject to any disclaimer, the term of this patent is extended or adjusted under 35 U.S.C. 154(b) by 0 days.

(21) Appl. No.: 09/641,835

(22) Filed: Aug. 18, 2000

(51) Int. Cl.[7] ............................. C25B 1/00; B01D 17/06

(52) U.S. Cl. ....................................... 205/555; 205/768

(58) Field of Search ............................. 205/555, 687, 205/768; 423/448

(56) References Cited

U.S. PATENT DOCUMENTS

| | | | |
|---|---|---|---|
| 3,404,061 A | 10/1968 | Shane et al. | 161/125 |
| 4,350,576 A | 9/1982 | Watanabe et al. | 204/101 |
| 4,895,713 A | 1/1990 | Greinke et al. | 423/448 |
| 5,149,518 A | 9/1992 | Mercuri et al. | 423/449 |
| 5,173,515 A | 12/1992 | Von Bonin et al. | 521/103 |
| 5,376,450 A | 12/1994 | Greinke et al. | 428/402 |
| 5,503,717 A | 4/1996 | Kang et al. | 205/478 |
| 5,582,811 A | 12/1996 | Greinke et al. | 423/265 |
| 5,698,088 A | 12/1997 | Kang et al. | 205/555 |

FOREIGN PATENT DOCUMENTS

| | | |
|---|---|---|
| EP | 0596801 | 5/1994 |
| JP | 6369705 | 3/1988 |
| JP | 1160609 | 6/1989 |
| JP | 2188418 | 7/1990 |
| JP | 5221624 | 8/1993 |
| RO | 114887 B | 8/1999 |
| RU | 1657474 | 6/1991 |
| RU | 1765114 | 9/1992 |
| RU | 1577244 | 3/1995 |
| RU | 1817438 | 3/1995 |
| RU | 2118941 | 9/1998 |

OTHER PUBLICATIONS

Yoshida et al., "Exfoliated Graphite from Various Intercalation Compounds", Carbon (1991)*, vol. 29, No. 8, pp. 1227–1231.*

Zhang et al., "Formation of Iron Chloride–Grpahite Intercalation Compounds in Propylene Carbonate by Electrolysis", Carbon (1997)*, vol. 35, No. 2, pp. 285–290.*

Kang et al., "Electrochemical Synthesis and Characterization of Formic Acid–Grpahite Intercalation Compound", Carbon (1997)* vol. 35, No. 8, pp. 1089–1096.*

Materials Research Bulletin 35, 2000, pp. 425–430; "On Lower–Nitrogen Expandable Graphite", by Song, Kemin, Dun Huijuan. No month available.

1999 Joint International Meeting, Honolulu, Hawaii, 10/17–22/99, Meeting Abstracts, Battery Div., "Study of the Lithium Intercalation Process in Mechanically Milled Graphite", Ong & Yang.

International Symposium of Carbon, 1998 (Tokyo), "Intercalation and Exfoliation of Graphite at Room Temperature", Mittal & Inagaki. No month available.

(List continued on next page.)

Primary Examiner—Edna Wong
(74) Attorney, Agent, or Firm—James R. Cartiglia

(57) ABSTRACT

Intercalated graphite flake is prepared having enhanced exfoliation characteristics in terms of at least one of reduced exfoliation temperature and increased expanded volume (also referred to as "worm volume"). The method entails contacting graphite flake with an organic expansion aid either before immersing in an aqueous intercalant solution or by dissolving the expansion aid in the aqueous intercalant solution prior to subjecting graphite flake to an electrolytic oxidation treatment therein. The graphite flake is subjected to electrolytic oxidation to provide intercalated graphite flake. Then, the intercalated graphite flake is recovered from the bulk of the intercalant solution and is preferably washed and further treated with a suitable surfactant in order to reduce the exposed gallery acids on the subsequently dried flake.

21 Claims, 1 Drawing Sheet

OTHER PUBLICATIONS

Tanso 1997, No. 180, pp. 239–244, "Preparation of Alkali Metal–Graphite Intercalation Compounds in Tetrahydrofuran Type of Solvents", Mizutani et al. No month available.

Carbon vol. 35, No. 8, pp. 1089–1096, 1997, "Electrochemical Synthesis and Characterization of Formic Acid–Graphite Intercalation Compound", Kang e t al. No month available.

Inorganic Materials, vol. 33, No. 6, 1997, pp. 584–587, "Synthesis of Interclation Compounds in the System Graphite $HNO_3$–$H_2SO_4$", Avdeev et al. No month available.

Inorganic Materials, vol. 33, No. 6, 1997, pp. 580–583, "Intercalation of Sulfuric Acid into Graphite in the Presence of Gaseous Oxidizers and Oleum", Avdeev et al. No month available.

Carbon vol. 35, No. 4, pp. 563–566, 1997, "A Novel Typeof Reaction in the Chemistry of Graphite Intercalation Compounds. The Preparation of Alkali Metal Graphite Intercalation Compounds by Ion Exchange Reactions", Isaev et al. No month available.

Carbon vol. 35, No. 2, pp. 285–290, 1997, Formation of Iron Chloride–Graphite Intercalation Compounds in Propylene Carbonate by Electrolysis, Zhang et al. No month available.

Carbon vol. 35, No. 1, pp. 61–65, 1997, "Graphite Intercalation Compounds Prepared in Solutions of Alkali Metals in 2–Methyltetrahydrofuran and 2, 5–Dimethyltetrahydrofuran", Mizutani et al. No month available.

Carbon vol. 34, No. 12, Letter to the Editor, "Preparation of Lower–Sulfur Content and Expandable Graphite", Chen et al. No date available.

Journal of Electrochem Society, vol. 143, No. 11, 1996, "Structure and Lithium Intercalation Properties of Synthetic and Natural Graphite", Shi et al. No month available.

The European Carbon Conference "Carbon 96"—Newcastle, UK, Jul. 1996, "Direct Thermooxidative Conversion of Graphite to Exofoliated Graphite. The Way to Novel Technologies", Savoskin et al.

Journal Phys. Chem Solids, vol. 57, Nos. 6–8, pp. 925–930, 1996, "Ternary Graphite Intercalation Compounds of Type $M(NH_3)_xC_y$ With M = Be, Mg, Al, Sc, Y, La. Electrochemical Synthesis, Stability and NMR Studies", Stumpp et al. No month available.

Journal Phys. Chem Solids, vol. 57, Nos. 6–8, pp. 883–888, 1996, "Electrochemical Synthesis of Sulfate Graphite Intercalation Compounds with Different Electrolyte Concentrations", Kang et al. No month available.

Journal Phys. Chem Solids, vol. 57, Nos. 6–8, pp. 783–786, 1996, Debye–Waller Factors of ICl–Graphite Intercalation Compounds Prepared From Natural Graphite Flakes and Graphitized Polymide Films, Abe et al. No month available.

Carbon '94, Jul. 3–8, 1994, Granada, Spain, Extended Abstracts and Programme, The University of Granada, "Synthesis of $FECl_3$–GIC Using Electrochemical Method in an Aqueous Solution", Kang et al.

Carbon, vol. 31, No. 8, 1993, Printed in Great Britain, Letters to the Editor, "Room Temperature Exfoliation of Graphite Under Microgravity". No month available.

X Sympozjum Przemyslu Elektrodowego, Extended Abstracts, "Preparation of Flexible Graphite From Czech Natural Graphite"" Tomanova et al. No date available.

Carbon vol. 31, No. 7, pp. 1131–1137, 1993, "Intercalation of Perfluorobutanesulfonic Acid in Graphite", Ruisinger et al. No month available.

Carbon, vol. 31, No. 5, pp. 777–781, 1993, "Intercalation of $AlCl_3$, Into $FeCl_3$–Graphite Intercalation Compounds and Occurrence of Bi–Intercalation", Inagaki et al. No month available.

Carbon, vol. 31, No. 1, pp. 201–204, 1993, "Laser–Assisted Exfoliation of Potassium–Ammonia–Graphite Intercalation Compounds", Kuga et al. No month available.

American Carbon Society, Twentieth Conference on Carbon, Jun. 23–28, 1991, Extended Abstracts and Program, "Electrochemical Preparation of Metal–Ammonia Graphite Intercalation Compounds in Liquid Ammonia", Stumpp et al.

American Carbon Society, Twentieth Biennial Conference on Carbon, Jun. 23–28, 1991, Extended Abstracts and Program, "Preparation of New Graphite Intercalations Compounds in Anhydrous Hydrogen Fluoride", Selig et al.

Carbon, vol. 30, No. 2, pp. 207–212, 1992, "Intercalation Process in the Ternary System of $FeCl_3$–$NiCl_2$–KCI", Ohira et al.

Carbon, vol. 29, No. 8, pp. 1227–1231, 1991, "Exfoliated Graphite From Various Intercalation Compounds", Yoshida et al. No month available.

Carbon, vol. 29, Nos. 4/5, pp. 595–597, 1991, "Upon the Intercalation of Rhenium Heptoxide and Rhenium Trioxide Nitrate into Graphite", Scharff et al. No month available.

International Carbon Conference, Paris, 1990, "Study of Dissociation and Exfoliation of Graphite–Nitrate", Petitjean et al. No month available.

Carbon, vol. 28, No. 1, pp. 119–123, 1990, "Electrochemical Preparation Of The Graphite Bi–Intercalation Compound With $H_2SO_4$ And $FeCl_3$", Shioyama et al.

Synthetic Metals, 34, 1989, 145–150, "The Formation of Graphite Intercalation Compounds From Trichloroacetic Acid and Trichloroaetic Acid Chloride Solutions Containing Molybdenum Compounds", Schulz et al. No month available.

Synthetic Metals, 34, 1989, 139–144, Potential Survey of Intercalation of Sulfuric Acid Into Graphite by Chemical Oxidation, Iwashita et al. No month available.

Synthetic Metals, 34, 1989, 73–78, Preparation of Metal Halide Graphite Intercalation Compounds by Intercalate Exchange, Stump et al. No month available.

Synthetic Metals, 26, 1988, 41–47, Electrochemical Synthesis of Graphite Intercalation Compounds with Nickel and Hydroxides, Inagaki et al. No month available.

Synthetic Metals, 25, 1988, 181–187, "Formation of Metal Chloride–Graphite Intercalation Compounds in Molten Salts", Wang et al. No month available.

Synthetic Metals, 20, 1987, 9–13, The Synthesis of $NiCl_2$–$FeCl_3$–Graphite Intercalation Compounds, Inagaki et al. No month available.

Synthetic Metals, 20, 1987, 1–8, Synthesis of Cupric Chloride–Graphite Intercalation Compounds by the Molten Salt Method, Inagaki et al. No month available.

Journal of China University of Science and Technology, vol. 28, No. 2, 1998, "Chemical Preparation and Characterization of Expansible Graphite by H202 Oxidation", Chen, Zuyao.

Carbon, vol. 24, No. 6, pp. 731–735, 1986, "Etude de L'Exfoliation des Composes D'Insertion Graphite–Trioxyde de Soufre", Klatt et al. No month available.

Carbon '86, Proceedings, Jun. 30–Jul. 4, 1986, "Studies on the Exfoliation Mechanism of Intercalated Graphite Flakes", Mathur et al.

TANSO, No. 123, 1985, pp. 160–165, "Preparation of Exfoliated Graphite from Alkaline Metal–Graphite–Tetrahydrofurane Ternary Compounds", Inagaki et al. No month available.

Carbon, vol. 23, No. 5, p 595, 1995, "Intercalation of Graphite with Antimony Tetrachloride Fluoride". No month available.

TANSO, No. 121, 1985, pp. 65–69, "Synthesis of Strontium–Graphite Intercalation Compounds", Akuzawa et al. No month available.

American Carbon Society and Unversity of Kentucky, Jun. 16–21, 1985, Extended Abstracts and Program, "Reaction of Chloroacids with Graphite", Stumpp et al.

Journal of Applied Electrochemistry 13, 1983, pp. 147–155, "The Electrochemical Formation of Graphite–Bisulphate Intercalation Compounds", Berlouis et al. No month available.

Carbon, vol. 21, No. 3, pp. 181–188, 1983, "Intercalatin by $(SO_3F)_2$ in Various Forms of Graphite and Boron Nitride", Hooley. No month available.

American Carbon Society, Jul. 18–22, 1983, Extended Abstracts and Program, "Structure and Intercalation of Natural Flake Graphite", Murdie et al.

Journal of Materials Science 20, 1985, pp. 171–181, "Intercalation of Natural Flake Graphites", Murdie et al. No month available.

* cited by examiner

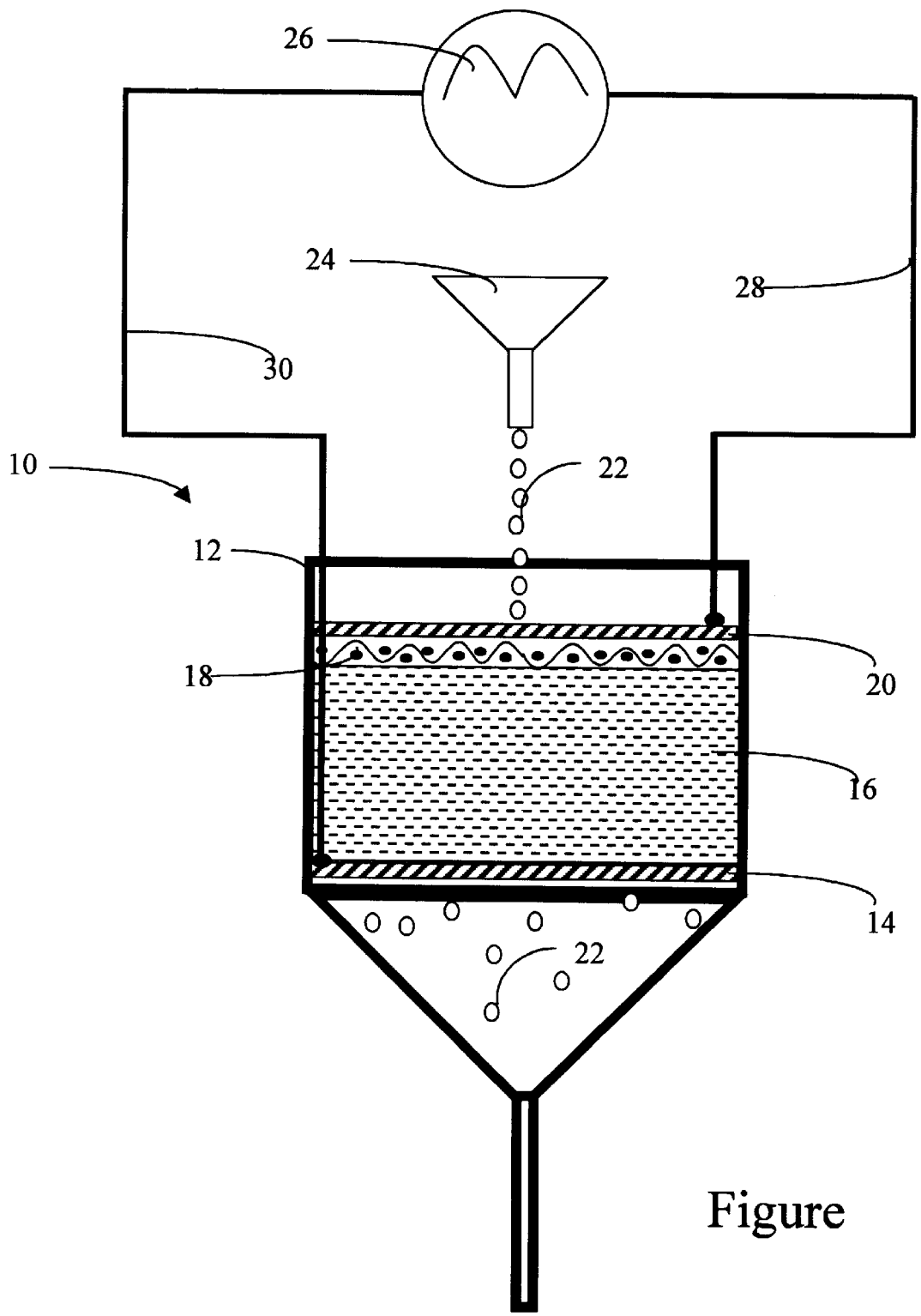
Figure

EXPANDABLE GRAPHITE AND METHOD

TECHNICAL FIELD

This invention relates to intercalated graphite flake having excellent exfoliation characteristics and to a process for preparing it. In particular, the preferred products of the invention have can be exfoliated at low temperature to good volume.

BACKGROUND OF THE ART

Graphite is a crystalline form of carbon wherein the atoms are bonded in flat layers (basal planes) with weaker bonds between the layers. This structure has enabled the preparation of expandable graphite flake by both chemical and electrochemical intercalation techniques. Once prepared, by either process, the intercalated graphite flake can be expanded, i.e., exfoliated, to greatly increase its volume by heating to a suitably elevated temperature.

Each of the basal planes is comprised of hexagonal arrays or networks of carbon atoms. These basal planes are substantially flat and are oriented or ordered substantially parallel to and equidistant from one another. These basal planes are linked or bonded together and groups thereof are arranged in crystallites. Highly-ordered graphite consists of crystallites of considerable size, with the crystallites being highly aligned or oriented with respect to one another and having well-ordered basal planes.

The graphite structure is typically described as having two axes—the "a" and "c" axes or directions. In this context, the "a" axis is in a direction parallel to basal planes and the "c" axis is in a direction perpendicular to the basal planes and the "a" axis.

The parallel layers of carbon atoms (basal planes) are held together by van der Waals forces, which are relatively weak. Graphite can be oxidized chemically or electrochemically to appreciably open a space between the basal layers so that a number of different molecules (also known as intercalants) can be entrapped between the layers. The process of intercalation provides a graphite flake capable of marked expansion in the "c" direction to form an expanded or intumesced graphite structure in which the laminar character is substantially retained.

At elevated temperature the intercalant decomposes and volatilizes to generate gases, causing the flakes of intercalated graphite to expand in an accordion-like fashion, increasing the dimension in the direction perpendicular to the crystalline planes of the graphite (in the c-direction). The result is the production of particles having a vermicular or worm-like structure.

Intercalated graphite flake has many useful applications. A common application is to exfoliate the intercalated graphite flake into vermicular-like structures which are then compressed into sheets of flexible graphite for use in the manufacture of a flexible foil, e.g., as described in U.S. Pat. No. 3,404,061. The sheets can be cut into desired shapes, or otherwise formed into gaskets, packing materials, fuel cell components, various mechanical and electrical component parts, or the like.

Intercalated graphite flake can also be used in a variety of products that take advantage of the high expansion characteristic of intercalated graphite flake when exposed to high temperature. One such product is a fire-retardant for use in combination with polymer foams to form seat cushions and furniture upholstery in aircraft. Upon exposure to high temperature conditions caused by the combustion of the polymer foam or a nearby material, the heat will cause the particles of intercalated graphite to exfoliate and thereby reduce or prevent combustion of the polymer foam and may, of itself, smother a fire. Since it is important to suppress or retard a fire before it has begun to spread, it would be a substantial advantage for an intercalated graphite flake product to exhibit a very high degree of exfoliation upon exposure to relatively low temperatures and preferably stay ahead of a developing flame or combustion front.

Preparation by the conventional chemical process entails oxidizing particles of graphite, such as natural graphite flake, with an intercalant, eg., a solution of sulfuric and nitric acid, to form a compound of graphite and the intercalant. This process can be accomplished in a bath of suitable intercalant solution. The treated particles of graphite are separated from the bulk of the intercalant, rinsed and dried. The resulting product is referred to as intercalated graphite flake. Representative processing of this type is described in the above-noted U.S. Pat. No. 3,404,061.

Preparation by electrochemical means can comprise contacting graphite flake with an intercalant and passing a current through the intercalant between a cathode and the graphite flake as the anode. Unlike the chemical process described above, the need for a strong chemical oxidant is replaced by the use of the electric current under a suitable voltage. Thus, strong oxidants such as nitric acid, filming nitric acid, permanganate, peroxides, among others, can be dispensed with. Typical of this type of processing are the procedures disclosed by U.S. Pat. No. 4,350,576 to Watanabe, et al., U.S. Pat. No. 5,503,717 to Kang, et al., and U.S. Pat. No. 5,698,088 to Kang, et al., the disclosures of which are incorporated herein by reference to illustrate cell construction and operation.

The first of these, Watanabe, et al., employs a more dilute acid solution as the electrolyte/intercalant than permitted in the chemical process of U.S. Pat. No. 3,404,061. Indeed, Watanabe, et al., find utility in solutions of only 30% sulfuric acid, but preferably employ 50% or more and eliminate the need for concentrated sulfuric acid or fuming nitric acid. However, the description does not address improving expansion, such as by reducing the intumescent temperature or improving the degree or rate of expansion.

In the process of Kang, et al., in U.S. Pat. No. 5,503,717, the use of sulfuric acid is dispensed with and, because natural graphite flakes are electrochemically intercalated with zinc chloride in aqueous solution, the graphite intercalation compound (referred to as a GIC) can be exfoliated thermally without the evolution of $SO_2$ or $SO_3$. However, it is stated in U.S. Pat. No. 5,698,088, that this preparation method is not ideal since the rapid heating of the GIC results in the release of chlorine in particular, which can be deleterious. Again here, the description does not address reducing the intumescent temperature or improving the degree or rate of expansion. And, the reduction of $SO_2$ and $SO_3$ is accompanied by added chloride.

Finally, in U.S. Pat. No. 5,698,088, Kang, et al., eliminate the need for chemicals containing either sulfate or chloride and rely instead on formic acid as the sole intercalant. However, the process appears to take extended reaction times to achieve suitable exfoliation volumes. Indeed, in the examples given, an intercalation reaction time of one hour did not impart any expansion to the flake. As to expansion temperature, they state only that the product may be rapidly expanded. They note that when a graduated quartz glass beaker is heated to a temperature between 400° C. and 800° C. in a muffle furnace and 0.1 g of product is rapidly poured into the beaker and held for 10 seconds, the measured expansion volume, depending on the chosen reaction time and current density, fills between 150 mL/g and 300 mL/g.

There remains a need for an electrolytic intercalation process capable of efficiently preparing intercalated graphite flake having excellent exfoliation characteristics, in particular, to provide products that can be exfoliated at low temperature to good volume.

SUMMARY OF THE INVENTION

It is an object of the invention to provide an improved electrolytic intercalation method capable of producing intercalated graphite flake having excellent expansion properties.

It is another object of the invention to provide an improved electrolytic intercalation method that enables preparing expandable graphite flake exhibiting one or more improved exfoliation characteristics.

It is a specific object of the invention to provide an improved electrolytic intercalation method that enables preparing expandable graphite flake exhibiting reduced exfoliation temperature.

It is another specific object of the invention to provide an improved electrolytic intercalation method that enables preparing expandable graphite flake exhibiting increased expanded volume (also referred to as "worm volume").

It is an object of the preferred form of the invention to provide an improved electrolytic intercalation method that enables preparing expandable graphite flake exhibiting reduced exfoliation temperature and increased expanded volume (also referred to as "worm volume").

These and other objects are achieved by the invention which makes practical use of a discovery that when graphite is electrolytically intercalated in the presence of an expansion aid, the resulting intercalated flake will exhibit one or more areas of improvement with regard to expansion. The invention provides both new methods capable of achieving these objectives and to the novel products of these methods.

The method entails contacting graphite flake with an organic expansion aid either before contact with an aqueous intercalant solution or by dissolving the expansion aid in the aqueous intercalant solution prior to subjecting graphite flake to an electrolytic oxidation treatment therein. The graphite flake is then subjected to electrolytic oxidation to provide intercalated graphite flake. Then, following intercalation, the intercalated graphite flake is recovered from the bulk of the intercalant solution and is preferably washed and further treated with a suitable surfactant in order to reduce the exposed gallery acids on the subsequently dried flake.

Many preferred aspects of the invention are described below.

BRIEF DESCRIPTION OF THE DRAWINGS

The invention will be better understood and its advantages will become more apparent when the following detailed description is read in light of the accompanying drawings, wherein:

The FIGURE is a schematic, cross-sectional view of an electrolytic cell useful in the process of the invention.

DETAILED DESCRIPTION OF INVENTION

The invention provides an electrolytic intercalation process capable of efficiently preparing intercalated graphite flake having excellent exfoliation characteristics. The FIGURE illustrates an exemplary electrolytic cell adapted to carry out the procedure of the invention. In particular, the invention as illustrated and explained herein can provide intercalated graphite flake products that can be exfoliated at low temperature to good volume. The invention enables the improved results by the addition of an organic expansion aid, either to the intercalation solution itself or, in some cases, to the graphite flake prior to intercalation.

The method of the invention enables preparing expandable graphite flake exhibiting one or more improved exfoliation characteristics. Among these improvements can be reduced exfoliation temperature and increased expanded volume (also referred to as "worm volume"). The term "worm volume", with units of cubic centimeters per gram (cc/g), is defined herein to mean the volume per unit mass of graphite obtained after heating and is commonly referred to as specific volume. The worm volume determination is made by placing the intercalated graphite flake in a 900° C. nickel crucible placed over a Bunsen burner flame to cause exfoliation. The specific volumes of the worms were measured by transferring them to a graduated cylinder and normalizing the volume to the weight of the worms (cc/g). In essence, the invention makes practical use of a discovery that when graphite is electrolytically intercalated in the presence of an expansion aid, the resulting intercalated flake will exhibit one or more areas of improvement with regard to expansion. The invention will enable the preparation of flake having a worm volume of greater than 200 cc/g and preferably 325 cc/g and higher.

The invention will be used with good effect on graphite from a number of sources, but has particular advantage to those graphite materials from natural sources. Among these is graphite flake having a median particle length and width of 0.05 mm to 1 mm. Graphite flake is available from deposits located throughout the world, including Canada, Mexico, Madagascar, India, China, Korea, and Russia.

The method of the invention entails contacting graphite flake with an organic expansion aid, either before intercalating with an aqueous intercalant solution or by dissolving the expansion aid in the aqueous intercalant solution prior to subjecting graphite flake to an electrolytic oxidation treatment therein. Whether contact is before or after, the graphite flake is subjected to an electrolytic oxidation treatment in an aqueous intercalant solution to provide intercalated graphite flake. Then, following intercalation, the intercalated graphite flake is preferably washed and further treated with a suitable surfactant prior to drying as taught in U.S. Pat. No. 5,376, 450. The surfactant is believed to relieve the stress on the edges of the intercalated graphite flake during drying, which prevents the wrinkling, distorting and reopening of the edges of the graphite layer planes and which in turn prevents the subsequent exposure of the gallery acids (the acids entrapped between the layers of the flake).

The FIGURE illustrates a schematic, cross-sectional view of an electrolytic cell useful in the process of the invention. An electrolytic cell 10 is shown to include an outer container comprised of a Buchner funnel 12, a porous anode support 14 of a suitable material, such as lead or platinum, supporting graphite flake 16 as the anode. A spacer element 18, such as of Teflon® polymer fabric, can by positioned above the graphite flake 16 to separate it from the cathode 20, of a suitable material such as graphite. Both anode support 14 and cathode 20 are porous to permit intercalant solution to saturate the graphite and to pass through the cell from top to bottom. The cell will be saturated with an aqueous intercalant solution 22 which is provided by supply source 24. A power source 26 is provided to supply current to the cell at a desired voltage, each of which can be regulated in known manner. Electrical contact to the graphite flake can be achieved by the use of a suitable means such as anode support 14 and lead 30 from the power source. Similarly, a lead 28 is furnished to provide connection between the cathode 20 and the power source 26. It will be understood by those skilled in the art that the details of cell construction and operation can be adapted as required by the reactants and ambient conditions. The references cited above are hereby incorporated by reference with regard to their disclosures of cell construction and operation.

The graphite flake is subjected to an electrolytic oxidation treatment, preferably at a current density of from about 0.02 to about 0.06 amps per square centimeter, e.g., about 0.04 amps per square centimeter and at a cell voltage of from about 1 to about 6 volts, e.g., from about 4 to 5 volts. These values may reasonably vary with changes in cell configuration and makeup.

In a preferred embodiment of the invention, the intercalant is a solution of sulfuric acid and the expansion aid described in more detail below. Because the process is electrolytic, there is no need for an oxidizing agent such as nitric acid, perchloric acid, chromic acid, potassium permanganate, peroxides, iodic or periodic acids, or the like. Although less preferred, the intercalant may contain metal halides such as ferric chloride, and ferric chloride mixed with sulfuric acid, or a halogen, such as bromine as a solution of bromine and sulfuric acid or bromine in an organic solvent.

The expansion aid of the invention will be an organic material sufficiently soluble in the aqueous intercalant solution to achieve the objectives of the invention. More narrowly, organic materials of this type that contain carbon, hydrogen and oxygen, preferably exclusively, may be employed, e.g., carboxylic acids. A suitable carboxylic acid as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 10 carbon atoms, which is soluble in the aqueous intercalant solution employed according to the invention in amounts effective to provide a measurable improvement of one or more aspects of exfoliation. Also, alkyl esters of these acids can be employed. Preferred products are characterized by an intumescent temperature of below about 200° C. Suitable water-miscible organic solvents or surfactant complexes can be employed to improve solubility of an organic expansion aid in the intercalant solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in the aqueous intercalant.

Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalant solution will be aqueous and will preferably contain from about 30 to about 85% water, or more narrowly, from about 50 to about 75% water, by weight of the solution. In one preferred form, the aqueous intercalant solution comprises from about 10 to 75% sulfuric acid, the expansion aid comprises an amount effective to enhance exfoliation of from about 1 to 10% of a carboxylic acid soluble in said aqueous intercalant solution, and the intercalant solution contains from about 30 to about 85% water, all percentages based on the weight of the solution. In the embodiment wherein the expansion aid is contacted with the graphite flake prior to immersing in the aqueous intercalant solution, the expansion aid can be admixed with the graphite by suitable means, such as a V-blender, typically in an amount of from about 0.2% to about 10% by weight of the graphite flake.

The following Examples are provided to further illustrate and explain a preferred form of the invention and are not to be taken as limiting in any regard. Unless otherwise indicated, all parts and percentages are by weight.

EXAMPLE 1

An electrochemical cell is prepared by placing 25 grams of natural graphite flake having a 50 mesh particle size on a 3 inch diameter porous lead disk anode support placed in a Buchner funnel. An electrical lead is extended from the lead disk to an external power source. A 3 inch diameter sheet of Teflon® polymer fabric is placed top of the graphite flake. On top of the fabric sheet, a porous graphite cathode disk is inserted and connected to the external power source. An aqueous intercalant solution comprising 25% by weight sulfuric acid and 3.5% oxalic acid is dripped through the contents of the Buchner funnel. A current is applied between the cathode and the graphite flake as the anode for 120 minutes. The current is 2 amperes (0.04 amp per square centimeter, anode current density) and the voltage is 5 volts. Following electrolytic treatment, the resulting intercalated flake is washed with water and dried.

EXAMPLE 2

The procedure of Example 1 is repeated, but this time 0.25 grams of butyl stearate is added to 25 grams of the intercalated flakes following the final washing.

EXAMPLE 3

The procedure of Example 1 is repeated, but this time 2 grams of formic acid is added to the graphite flakes prior to placing them in the cell and the oxalic acid is omitted from the intercalant solution.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A method for preparing expandable graphite flake exhibiting one or more improved exfoliation characteristics, which comprises:
   (a) contacting graphite flake with an organic expansion aid;
   (b) subjecting said graphite flake to an electrolytic oxidation treatment with an aqueous intercalant solution to provide intercalated graphite flake, said aqueous intercalant solution comprising sulfuric acid; and
   (c) recovering said intercalated graphite flake.

2. A method according to claim 1 wherein the graphite flake is contacted with said expansion aid prior to subjecting said graphite flake to electrolytic oxidation.

3. A method according to claim 1 wherein the graphite flake is contacted with said expansion aid by dissolving said expansion aid in said aqueous intercalant solution prior to subjecting said graphite flake to electrolytic oxidation therein.

4. A method according to claim 1 wherein said expansion aid comprises a carboxylic acid soluble in said aqueous intercalant solution in an amount effective to enhance exfoliation.

5. A method according to claim 4 wherein said carboxylic acid comprises a carboxylic acid selected from the group consisting of lower aliphatic carboxylic acids and dicarboxylic acids and mixtures of these.

6. A method according to claim 5 wherein said acid comprises a carboxylic acid of the formula $H(CH_2)_n COOH$ wherein n is a number of from 0 to about 5.

7. A method according to claim 1 wherein said intercalant solution contains from about 30 to about 85% water by weight of the solution.

8. A method according to claim 7 wherein said intercalant solution contains from about 50 to about 75% water by weight of the solution.

9. A method according to claim 1 wherein said aqueous intercalant solution comprises from about 10 to 75% sulfuric acid, said expansion aid comprises an amount effective to enhance exfoliation of from about 1 to 10% of a carboxylic acid soluble in said aqueous intercalant solution, and said intercalant solution contains from about 30 to about 85% water, all percentages based on the weight of the solution.

10. A method according to claim 1 wherein the electrolytic oxidation treatment comprises passing a current between a cathode and the graphite flake as an anode at an anode current density of from about 0.02 to about 0.06 amps per square centimeter.

11. A method according to claim 1 wherein the electrolytic oxidation treatment comprises passing a current between a cathode and the intercalant wet graphite flake as an anode at a cell voltage of from about 1 to about 6 volts.

12. A method for preparing expandable graphite flake exhibiting one or more improved exfoliation characteristics, which comprises:
   (a) contacting graphite flake with an organic expansion aid comprising a carboxylic acid selected from the group consisting of lower aliphatic carboxylic acids and dicarboxylic acids and mixtures of these, said contacting being prior to subjecting said graphite flake to electrolytic treatment;
   (b) then, subjecting said graphite flake to an electrolytic oxidation treatment using an aqueous, intercalant solution to provide intercalated graphite flake, by passing a current through the solution between a cathode and graphite flake wet with the intercalant as an anode at a current density of from about 0.02 to about 0.06 amps per square centimeter and at a cell voltage of from about 1 to about 6 volts, said aqueous intercalant solution comprising from about 10 to 75% sulfuric acid and said expansion aid comprises a carboxylic acid soluble in said aqueous intercalant solution and is employed in an amount of from about 1 to 10%, both percentages based on the weight of the intercalant solution; and
   (c) recovering said intercalated graphite flake.

13. A method for preparing expandable graphite flake exhibiting one or more improved exfoliation characteristics, which comprises:
   (a) subjecting said graphite flake to an electrolytic oxidation treatment by passing a current through the solution between a cathode and the graphite flake as an anode at a current density of from about 0.02 to about 0.06 amps per square centimeter and at a cell voltage of from about 1 to about 6 volts with an aqueous intercalant solution containing from about 10 to 75% sulfuric acid based on the weight of the solution and an organic expansion aid in an amount of from about 1 to 10%, to provide intercalated graphite flake; and
   (b) recovering said intercalated graphite flake.

14. A method for preparing expandable graphite flake exhibiting one or more improved exfoliation characteristics, which comprises:
   (a) contacting graphite flake with an organic expansion aid;
   (b) subjecting said graphite flake to an electrolytic oxidation treatment with an aqueous intercalant solution to provide intercalated graphite flake, said aqueous intercalant solution comprising from about 10 to 75% sulfuric acid, said expansion aid comprises an amount effective to enhance exfoliation of from about 1 to 10% of a carboxylic acid soluble in said aqueous intercalant solution, and said intercalant solution contains from about 30 to about 85% water, all percentages based on the weight of the solution; and
   (c) recovering said intercalated graphite flake.

15. A method according to claim 14 wherein the graphite flake is contacted with said expansion aid prior to subjecting said graphite flake to electrolytic oxidation.

16. A method according to claim 14 wherein the graphite flake is contacted with said expansion aid by dissolving said expansion aid in said aqueous intercalant solution prior to subjecting said graphite flake to electrolytic oxidation therein.

17. A method according to claim 14 wherein said carboxylic acid comprises a carboxylic acid selected from the group consisting of lower aliphatic carboxylic acids and dicarboxylic acids and mixtures of these.

18. A method according to claim 17 wherein said acid comprises a carboxylic acid of the formula $H(CH_2)_n COOH$ wherein n is a number of from 0 to about 5.

19. A method according to claim 14 wherein said intercalant solution contains from about 50 to about 75% water by weight of the solution.

20. A method according to claim 14 wherein the electrolytic oxidation treatment comprises passing a current between a cathode and the graphite flake as an anode at an anode current density of from about 0.02 to about 0.06 amps per square centimeter.

21. A method according to claim 14 wherein the electrolytic oxidation treatment comprises passing a current between a cathode and the intercalant wet graphite flake as an anode at a cell voltage of from about 1 to about 6 volts.

* * * * *

UNITED STATES PATENT AND TRADEMARK OFFICE
CERTIFICATE OF CORRECTION

PATENT NO. : 6,406,612 B1
DATED : June 18, 2002
INVENTOR(S) : Ronald Alfred Greinke It is certified that error appears in the above-identified patent and that said Letters Patent is hereby corrected as shown below:

<u>Title page,</u>
Add -- [63] Related U.S. Application Data This application claims benefit of application No. 60/135,080, filed on May 20, 1999 --.
Item [57], ABSTRACT,
Line 4, after the word "polycyclic" the word "olefin" should be added so that it reads
-- polycyclic olefin --
Item [56], References Cited, OTHER PUBLICATIONS, "... "Synthesis of FECl$_3$-GIC Using..." should read as -- ... "Synthesis of FeCl$_3$-GIC Using... --
OTHER PUBLICATIONS, "American Carbon Society, Twentieth Conference on Car --" should read as -- American Carbon Society, Twentieth Biennial Conference on Car- --; and
"... "Intercalatin by" should read as -- ... "Intercalation by --

<u>Column 2,</u>
Line 26, "...such as nitric acid, filming" should read as -- ... such as nitric acid, fuming --

Signed and Sealed this

Fifteenth Day of October, 2002

Attest:

Attesting Officer

JAMES E. ROGAN
*Director of the United States Patent and Trademark Office*